United States Patent
Ryon et al.

(10) Patent No.: US 10,605,171 B2
(45) Date of Patent: Mar. 31, 2020

(54) FUEL NOZZLE MANIFOLD SYSTEMS FOR TURBOMACHINES

(71) Applicant: Delavan Inc., West Des Moines, IA (US)

(72) Inventors: Jason A. Ryon, Carlisle, IA (US); Lev Alexander Prociw, Johnston, IA (US); Gregory A. Zink, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 163 days.

(21) Appl. No.: 15/949,776

(22) Filed: Apr. 10, 2018

(65) Prior Publication Data

US 2019/0309686 A1    Oct. 10, 2019

(51) Int. Cl.
*F02C 7/22*    (2006.01)
*F23R 3/28*    (2006.01)
*F23R 3/46*    (2006.01)

(52) U.S. Cl.
CPC .............. *F02C 7/222* (2013.01); *F23R 3/283* (2013.01); *F23R 3/46* (2013.01)

(58) Field of Classification Search
CPC .... F02C 7/222; F23R 3/14; F23R 3/28; F23R 3/283; F23R 3/286; F23R 3/30; F23R 3/32; F23R 3/34; F23R 3/343; F23R 3/46
See application file for complete search history.

(56) References Cited

U.S. PATENT DOCUMENTS 2,970,438 A    2/1961    Howald
4,028,888 A *  6/1977    Pilarczyk ................ F02C 7/222
                                                      60/798

(Continued)

FOREIGN PATENT DOCUMENTS

EP    3109548 A1    12/2016
EP    3173602 A1    5/2017
GB     840529 A    7/1960

OTHER PUBLICATIONS

Extended European search report issued in corresponding European patent application No. 19167652.7 dated Sep. 3, 2019.

*Primary Examiner* — William H Rodriguez
(74) *Attorney, Agent, or Firm* — Locke Lord LLP; Daniel J. Fiorello; Scott D. Wofsy

(57) ABSTRACT

An internal fuel manifold for a turbomachine can include an outer ring defining one or more fuel supply channels configured to allow fuel flow around at least a portion of a circumference of the outer ring, and a plurality of branches extending radially inward from the outer ring. The branches include a high aspect ratio shape. The plurality of branches can include one or more branch fuel channels in fluid communication with at least one of the one or more fuel supply channels. The manifold includes one or more injector connectors extending axially aft from each branch, each injector connector in fluid communication with a branch fuel channel and configured to connect to a fuel injector. The manifold can include an inner ring extending from the plurality of branches. The inner ring and the outer ring are configured to receive a fuel injector and combustor assembly therebetween and to allow retaining of the fuel injector assembly and combustor assembly to the internal fuel manifold.

20 Claims, 16 Drawing Sheets

(56) References Cited

U.S. PATENT DOCUMENTS

| | | | | |
|---|---|---|---|---|
| 4,305,255 A * | 12/1981 | Davies | F02C 7/22 60/741 |
| 4,402,184 A * | 9/1983 | Faulkner | F02C 7/222 60/739 |
| 4,903,478 A * | 2/1990 | Seto | F02C 7/222 60/39.281 |
| 5,036,657 A * | 8/1991 | Seto | F02C 7/222 60/39.281 |
| 5,168,698 A * | 12/1992 | Peterson | F02C 7/222 60/739 |
| 5,289,685 A * | 3/1994 | Hoffa | F02C 7/222 60/739 |
| 2005/0160738 A1* | 7/2005 | Fish | F02C 7/222 60/776 |
| 2008/0072601 A1* | 3/2008 | Morenko | F02C 3/145 60/739 |
| 2015/0121883 A1* | 5/2015 | Wolfe | F01D 25/00 60/739 |
| 2015/0323186 A1* | 11/2015 | Xu | F02C 7/224 60/782 |
| 2015/0354517 A1* | 12/2015 | Mansour | F23R 3/28 239/397.5 |
| 2016/0245187 A1* | 8/2016 | Prociw | F01D 21/12 |
| 2018/0128492 A1* | 5/2018 | Boardman | F23R 3/14 |
| 2019/0024897 A1* | 1/2019 | Prociw | F23R 3/14 |
| 2019/0234311 A1* | 8/2019 | Morenko | F02C 7/222 |
| 2019/0309948 A1* | 10/2019 | Prociw | F23K 5/14 |
| 2019/0309949 A1* | 10/2019 | Prociw | F23R 3/283 |
| 2019/0309950 A1* | 10/2019 | Prociw | F23R 3/286 |

* cited by examiner

FUEL NOZZLE MANIFOLD SYSTEMS FOR TURBOMACHINES

BACKGROUND

1. Field

The present disclosure relates to turbomachines, more specifically to fuel nozzle manifold systems for turbomachines.

2. Description of Related Art

Fuel nozzles traditionally connect fuel manifolds located outside the gas turbine engine to the combustor located inside the engine. As a result of this arrangement, they are heavy and severely limited in size and number. These factors limit the ability to produce an optimal fuel-air mixture/gas temperature for the turbine and for emissions control. Traditional systems have cause a work load on the combustor which itself can limit how much mixing can be achieved and can be prone to durability issues.

Such conventional methods and systems have generally been considered satisfactory for their intended purpose. However, there is still a need in the art for improved fuel nozzle systems. The present disclosure provides a solution for this need.

SUMMARY

An internal fuel manifold for a turbomachine can include an outer ring defining one or more fuel supply channels configured to allow fuel flow around at least a portion of a circumference of the outer ring, and a plurality of branches extending radially inward from the outer ring. The branches include a high aspect ratio shape. The plurality of branches can each include one or more branch fuel channels in fluid communication with at least one of the one or more fuel supply channels. The manifold includes one or more injector connectors extending axially aft from each branch, each injector connector in fluid communication with a branch fuel channel and configured to connect to a fuel injector. The manifold can include an inner ring extending from the plurality of branches. The inner ring and the outer ring are configured to receive a fuel injector and combustor assembly therebetween and to allow retaining of the fuel injector assembly and combustor assembly to the internal fuel manifold.

In certain embodiments, the one or more branch fuel channels can include a plurality of branch fuel channels (e.g., all branches can include the same number). The at least one or more injector connectors can include a plurality of injector connectors. Each branch fuel channel can be connected to a respective injector connector, for example.

The one or more fuel supply channels can include a plurality of fuel supply channels. For example, the plurality of fuel supply channels include at least as many fuel supply channels as there are branch fuel channels in each branch such that each injector connector can be supplied with fuel independent of other injector connectors on the same branch.

The plurality of injector connectors can be disposed radially along the branch to form circumferential rows with injector connectors of other branches. In certain embodiments, each of the plurality of injector connectors can extend from the branch in a different direction.

The inner ring can be segmented to accommodate thermal expansion such that the inner ring is comprised of detached segments. Any other configuration for the inner ring is contemplated herein.

In certain embodiments, the branch can include a pull handle shape such that the branch extends axially forward from the outer ring and the inner ring. The outer ring and the inner ring can define a bayonet flange (or any other suitable connection interface) for connecting the fuel injector assembly using one or more retainer rings.

In accordance with at least one aspect of this disclosure, a fuel injector system can include a fuel manifold as described herein, a combustor dome mounted to the fuel manifold with one or more retainer rings, and a plurality of fuel injectors disposed in the combustor dome. Each fuel injector can be connected to a fuel injector connector of the fuel manifold and configured to mix air and fuel.

In certain embodiments, the combustor dome can be mounted to the fuel manifold with two retaining rings which presses against the combustor dome to provide positive force to engage each fuel injector with each fuel injector connector. The two retainer rings can include combustor seals. The system can include a combustor liner disposed between the retainer rings in contact with the combustor seals.

The plurality of fuel injectors can be disposed in the combustor dome in a plurality of circumferential rows to allow radial fuel staging. In certain embodiments, each fuel injector in a radially outward row and radially inward row are angled relative to an axial axis to effuse fuel and air into the combustor liner parallel to or away from walls of the combustor liner to prevent impingement on the walls of the combustor liner.

Each of the fuel injectors can include one or more standoff features configured to mate with one or more locator apertures defined in the combustor dome to orient each fuel injector on the combustor dome to such that each fuel injector aligns with each fuel injector connector. In certain embodiments, the plurality of fuel injectors includes about 90 or more fuel injectors. The combustor dome can be made of a ceramic composite or any other suitable material, and other components can be made of any suitable material such as a suitable metal, ceramic, or composite.

A method of making an internal fuel manifold for a turbomachine can include additively manufacturing any suitable embodiment disclosed herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
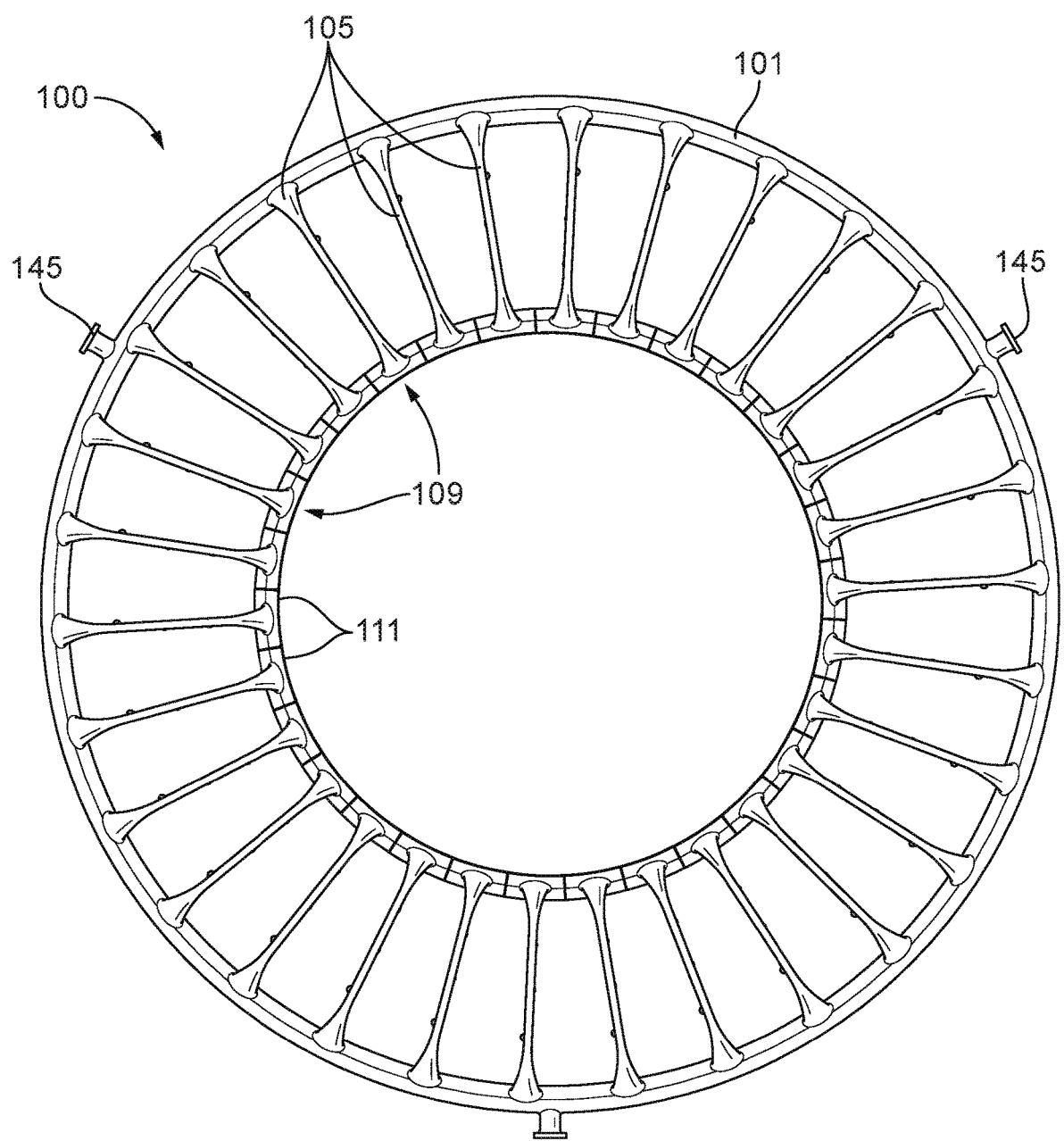
FIG. 1 is a forward plan view of an embodiment of an internal fuel manifold in accordance with this disclosure.

Reference will now be made to the drawings wherein like reference numerals identify similar structural features or aspects of the subject disclosure. For purposes of explanation and illustration, and not limitation, an illustrative view of an embodiment of a fuel manifold in accordance with the disclosure is shown in FIG. 1 and is designated generally by reference character 100. Other embodiments and/or aspects of this disclosure are shown in FIGS. 2-16.

Figure 2:
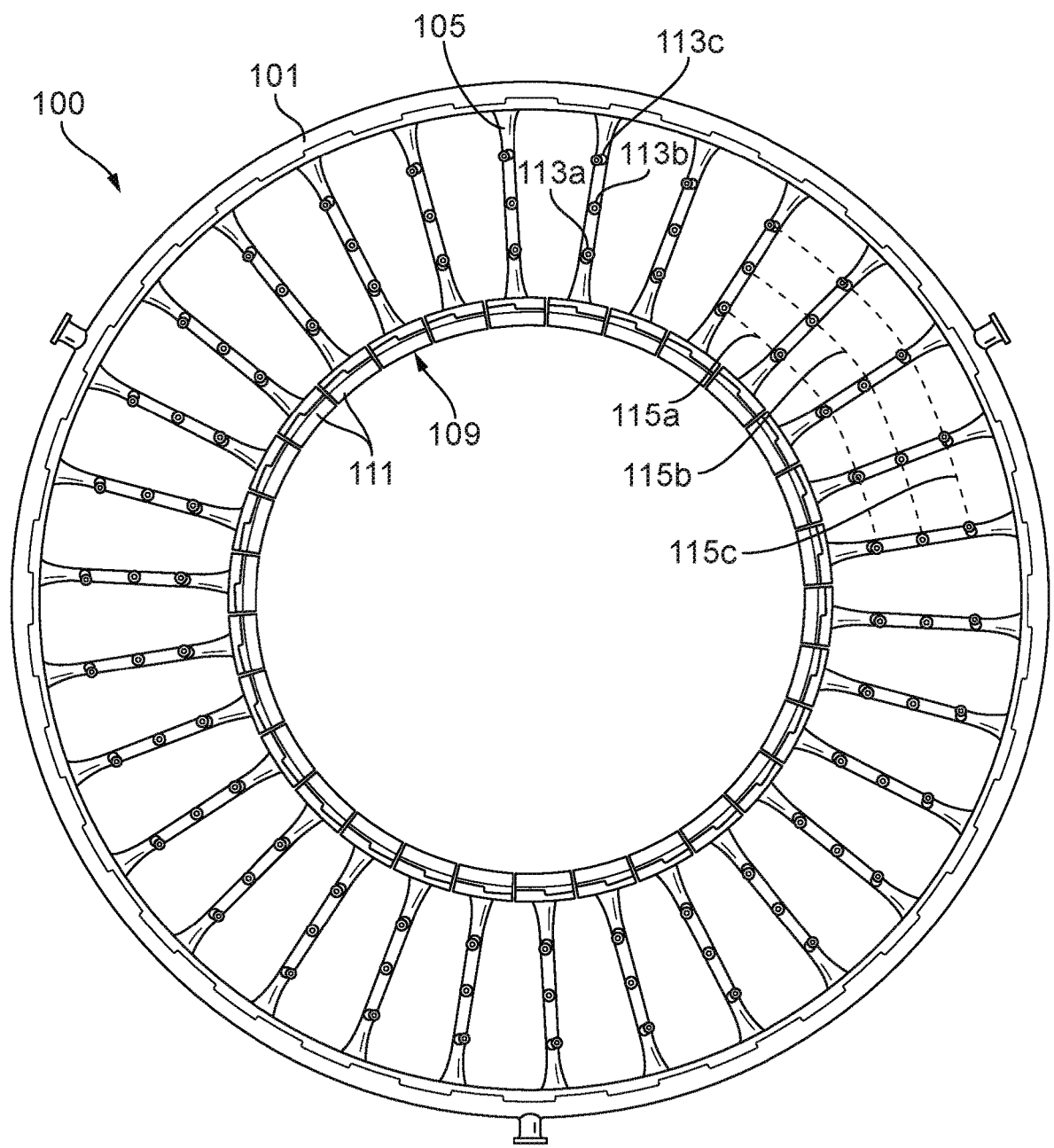
FIG. 2 is an aft plan view of the internal fuel manifold of FIG. 1.
Figure 3:
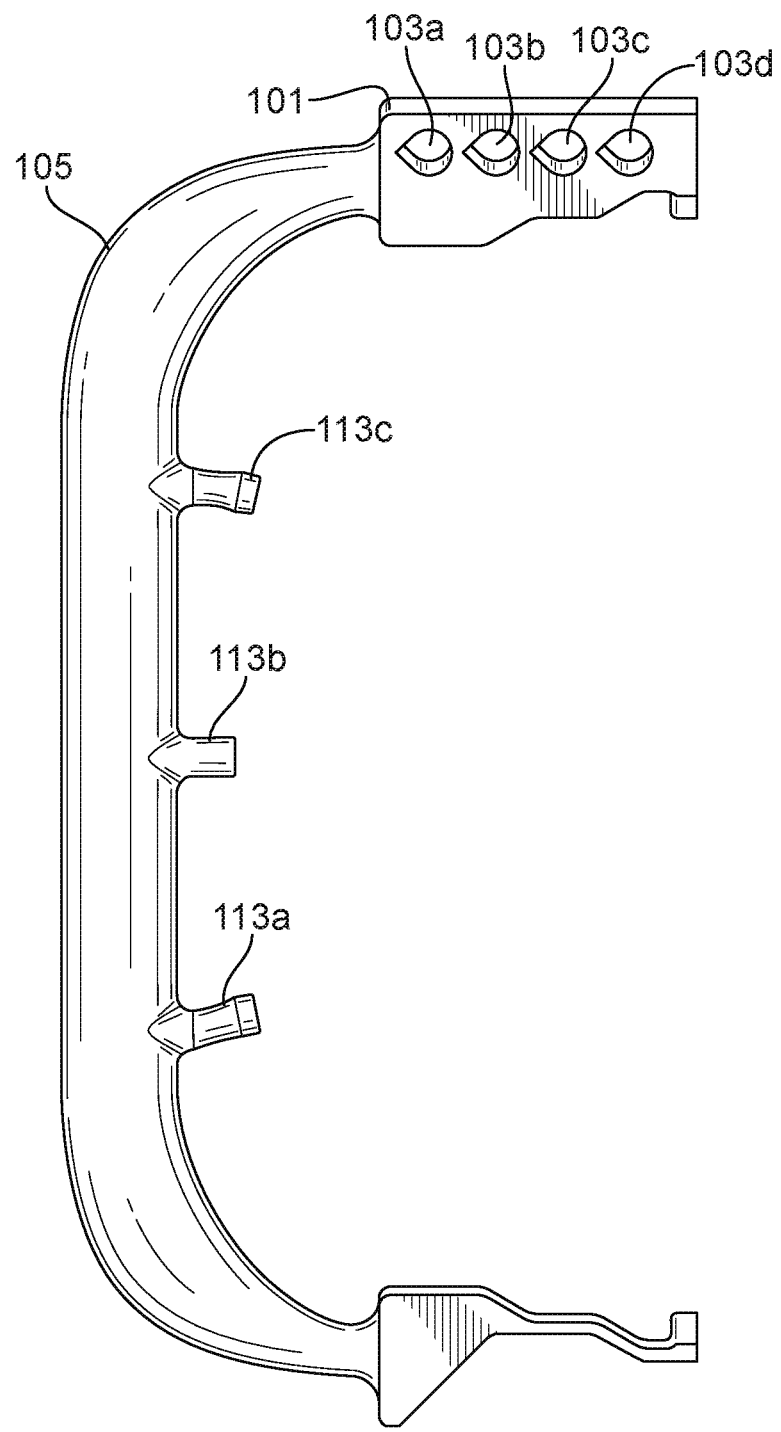
FIG. 3 is a side elevation view of a cutaway section of the embodiment of FIG. 1, showing an isolated fuel branch thereof.

Referring to FIGS. 1 and 2, an internal fuel manifold 100 for a turbomachine (not shown) can include an outer ring 101. Referring additionally to FIG. 3, the outer ring 101 defines one or more fuel supply channels 103a, 103b, 103c, 103d configured to allow fuel flow around at least a portion of a circumference of the outer ring 101.

Figure 4:
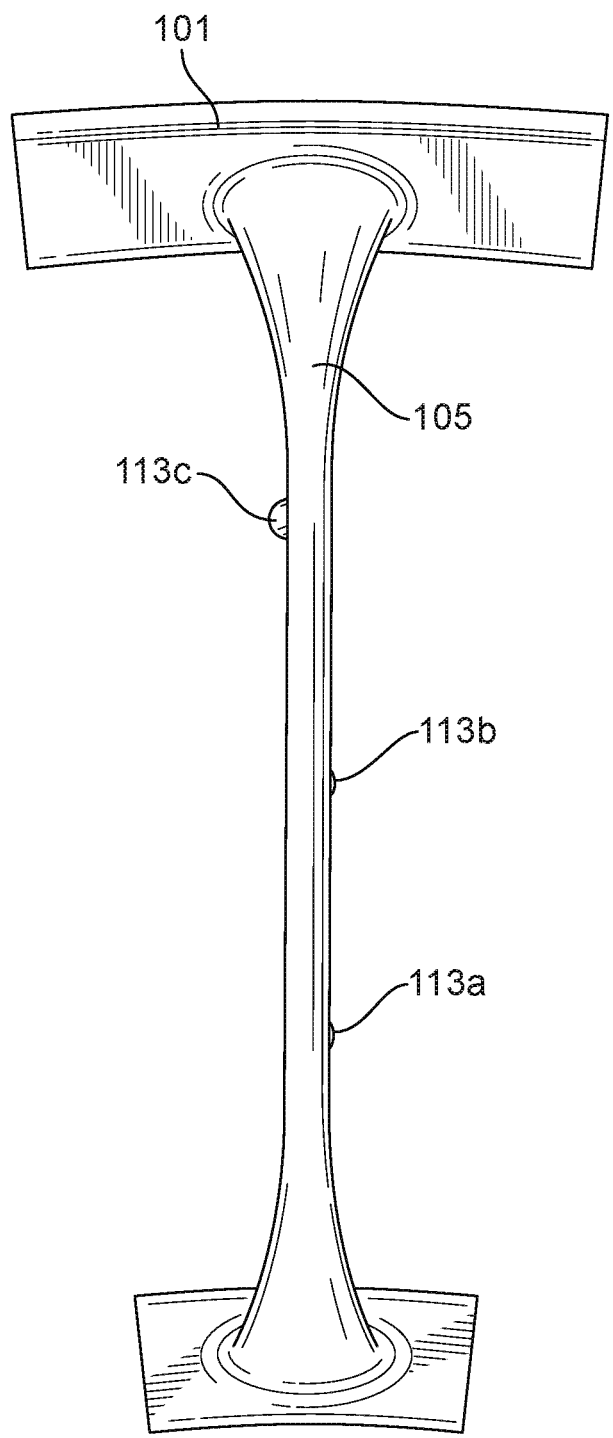
FIG. 4 is a forward view of the cutaway section of FIG. 3.
Figure 5:
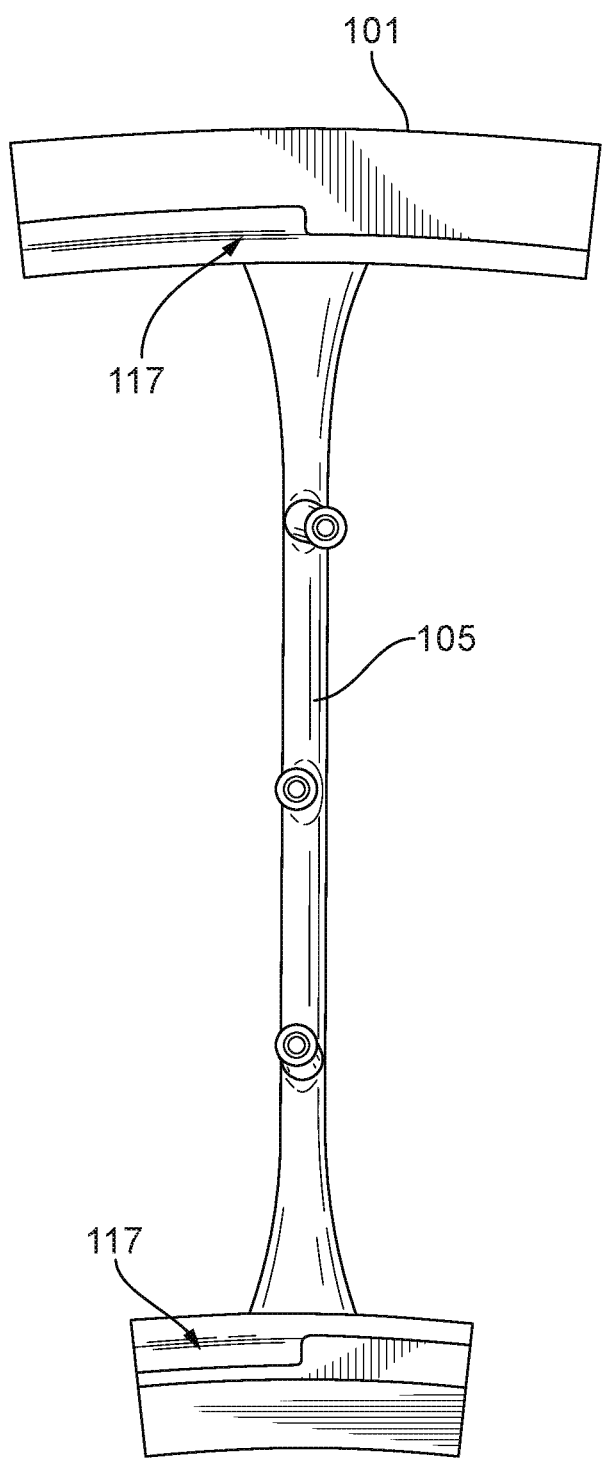
FIG. 5 is an aft view of the cutaway section of FIG. 3.

Referring additionally to FIGS. 4 and 5, the manifold 100 includes a plurality of branches 105 extending radially inward from the outer ring 101. The branches 105 include a high aspect ratio shape. For example, as shown, the branches 105 can be thin (e.g., in the circumferential direction of outer ring 101) to reduce blockage of airflow therethrough.

Figure 6:
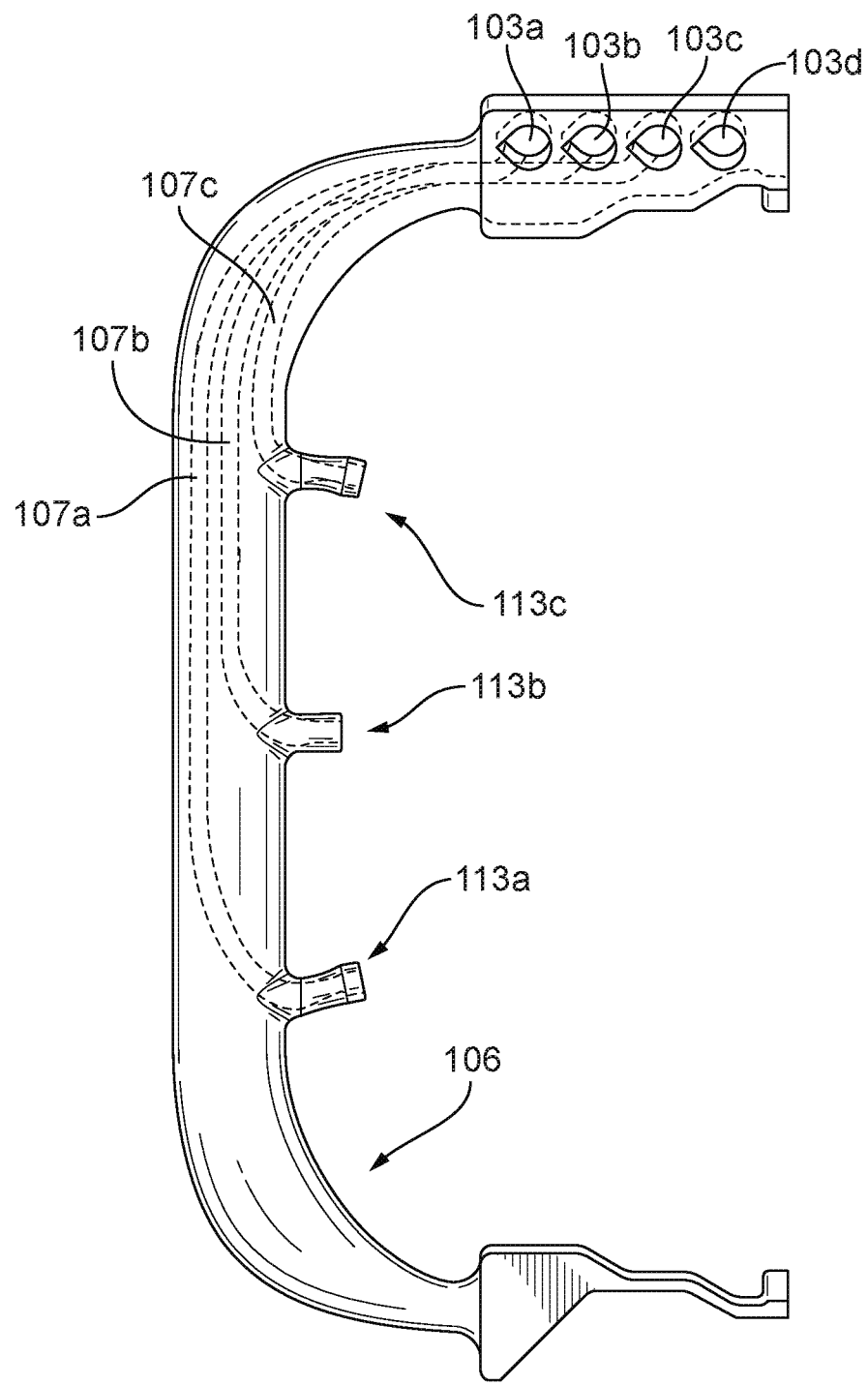
FIG. 6 is a see-through schematic view of the cutaway section of FIG. 3, showing internal branch fuel channels.
Figure 7:
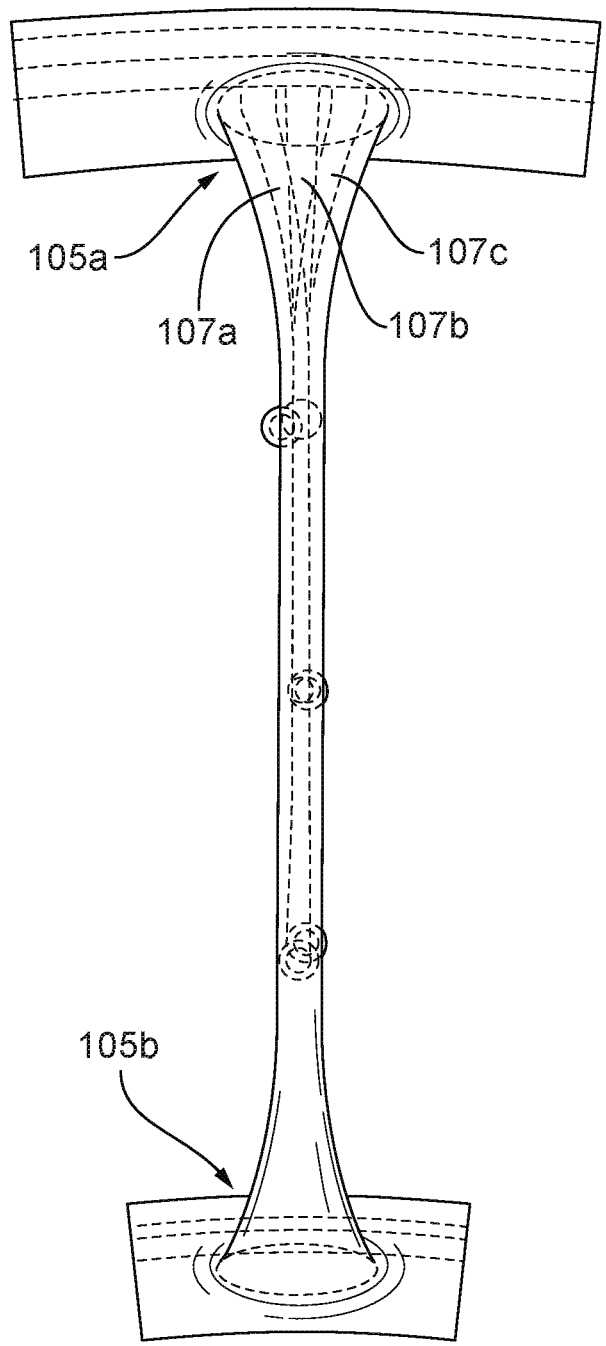
FIG. 7 is an aft view of the cutaway section of FIG. 6.

Referring additionally to FIGS. 6 and 7, the plurality of branches 105 can each include one or more branch fuel channels 107a, 107b, 107c in fluid communication with at least one of the one or more fuel supply channels 103, 103b, 103c, 103d.

The manifold 100 can include an inner ring 109 (e.g., defined by a plurality of inner ring segments 111) extending from the plurality of branches 105. The inner ring 109 can be segmented to accommodate thermal expansion such that the inner ring 109 is comprised of detached segments 111 which can move relative to each other due to thermal movement. Any other configuration for the inner ring 109 is contemplated herein. The inner ring 109 and the outer ring 101 can be configured to receive a fuel injector and combustor assembly 126 (e.g., as shown in FIGS. 9-16) therebetween and to allow retaining of the fuel injector assembly and combustor assembly to the internal fuel manifold 100. The inner ring and/or the bottom portion 106 of one or more branches 105 (e.g., radially inward of the most radially inward branch channel 107a) can be solid to improve stiffness, for example.

In certain embodiments, one or more of the branches 105 can include a pull handle shape as shown such that the branch 105 extends axially forward from the outer ring 101 and the inner ring 109. Each branch 105 can include the same shape, or any suitable branches 105 can have different shaped. One or more branches 105 can include an enlarging profile at the bases 105a, 105b thereof which can contributes to stiffness. The shape of the branches 105 can be optimized for weight and/or air blockage reduction and to have sufficient structural strength. The branches 105 can include any suitable shape.

The manifold 100 includes one or more injector connectors 113a, 113b, 113c extending axially aft from each branch 105. Each injector connector is in fluid communication with a branch fuel channel 107a, 107b, 107c and is configured to connect to a fuel injector (e.g., as shown in FIGS. 10-15).

In certain embodiments, the one or more branch fuel channels 107a, 107b, 107c can include a plurality of branch fuel channels 107a, 107b, 107c as shown (e.g., all branches 105 can include the same number, type, and/or pattern or any other suitable number, type, or pattern). The at least one or more injector connectors 113a, 113b, 113c can include a plurality of injector connectors 113a, 113b, 113c, for example. As shown, each branch fuel channel 107a, 107b, 107c can be connected to a respective injector connector 113a, 113b, 113c, respectively, for example.

The one or more fuel supply channels 103a, 103b, 103c, 103d can include a plurality of fuel supply channels 103a, 103b, 103c, 103d, e.g., as shown. For example, the plurality of fuel supply channels 103a, 103b, 103c, 103d can include at least as many fuel supply channels 103a, 103b, 103c, 103d as there are branch fuel channels 107a, 107b, 107c in each branch 105 such that each injector connector 113a, 113b, 113c can be supplied with fuel independent of other injector connectors 113a, 113b, 113c on the same branch 105. In this regard, each fuel injector connector 113a, 113b, 113c can be independently supplied with fuel allowing control over each fuel injector (e.g., as shown in FIGS. 9-16) connected thereto which can allow for more efficient control and operation of the combustor.

In certain embodiments, as best shown in FIG. 2, the plurality of injector connectors 113a, 113b, 113c can be disposed radially along the branch to form circumferential rows 115a, 115b, 115c with injector connectors 113a, 113b, 113c of other branches 105. In certain embodiments, as shown in FIGS. 3 and 5, each of the plurality of injector connectors 113a, 113b, 113c can extend from the branch 105 in a different direction.

Figure 8:
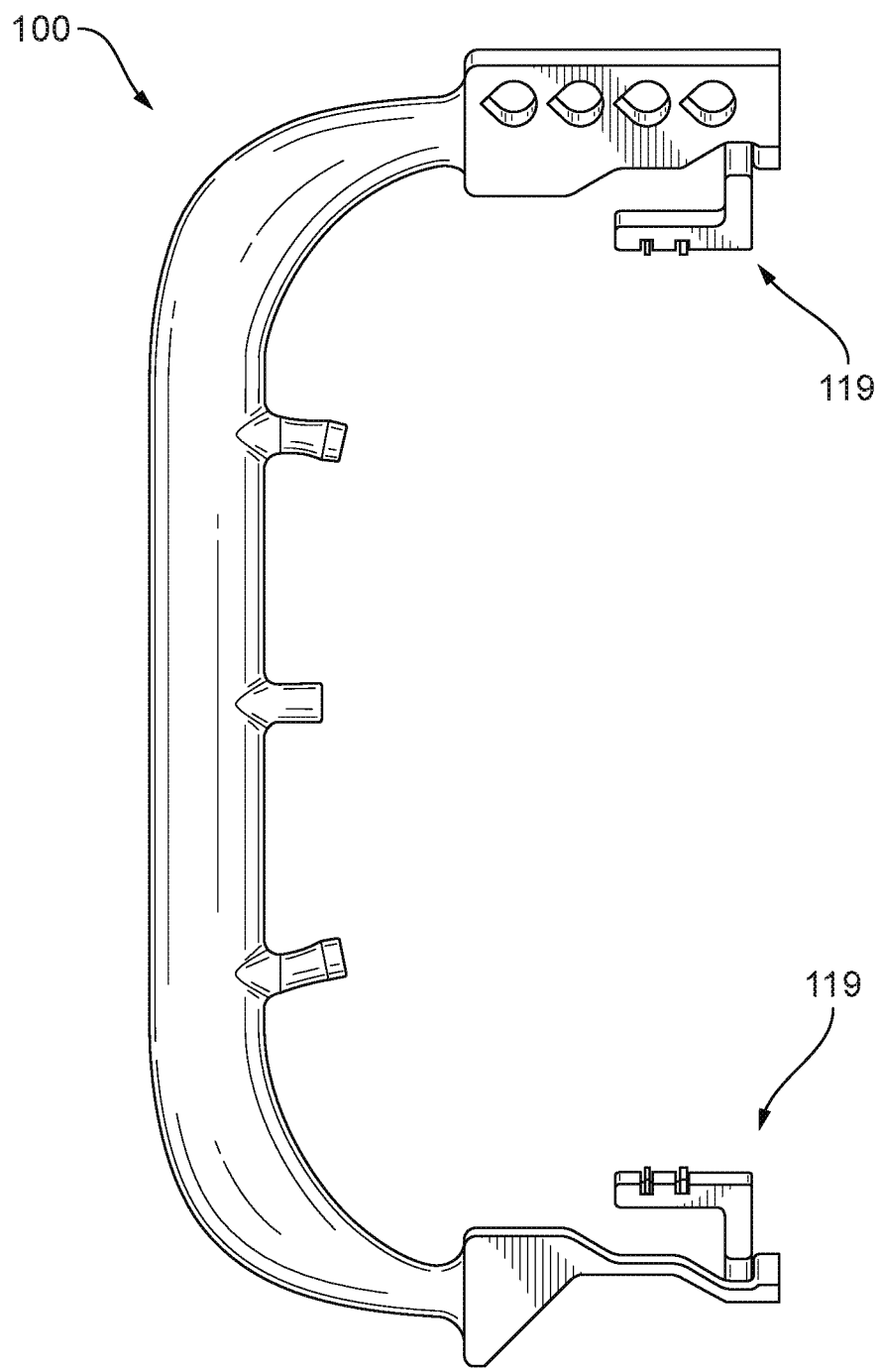
FIG. 8 is a side elevation view of a cutaway section of the embodiment of FIG. 1, showing flex rings disposed therein.
Figure 9:
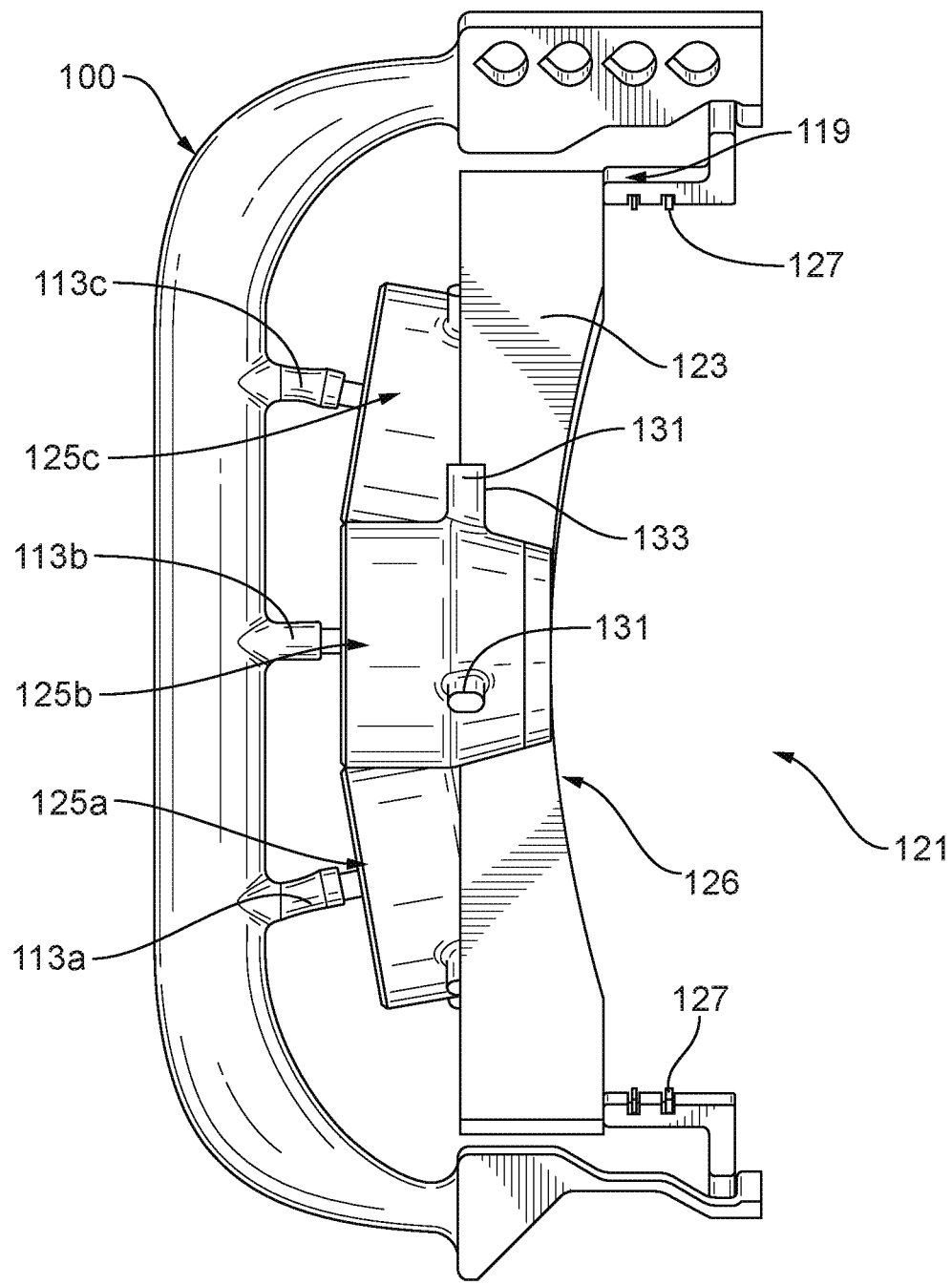
FIG. 9 is a side elevation view of a cutaway section of the embodiment of FIG. 8, showing fuel injectors connected to the manifold and retained within the manifold by the flex rings.

Referring to FIGS. 5 and 8-9, the outer ring 101 and the inner ring 109 can define a bayonet flange 117 (and/or any other suitable connection interface) for connecting the fuel injector assembly using one or more retainer rings 119, e.g., as shown in FIGS. 8-9. In accordance with at least one aspect of this disclosure, a fuel injector system 121 can include a fuel manifold 100 as disclosed herein, a combustor dome 123 mounted to the fuel manifold 100 with one or more retainer rings 119, and a plurality of fuel injectors 125a, 125b, 125c disposed in the combustor dome 123. Each fuel injector 125a, 125b, 125c can be connected to a fuel injector connector 113a, 113b, 113c of the fuel manifold 100 and be configured to mix air and fuel. The fuel injectors 125a, 125b, 125c can be arranged in circumferential rows in certain embodiments to align with a corresponding fuel injector connector 113a, 113b, 113c. As shown, e.g., in FIGS. 11 and 15, the fuel injectors 125a, 125b, 125c can be positioned such that minimal, if any, air blockage from the branches 105 is experienced. For example, the fuel injectors 125a, 125b, 125c may not pass under the branches 105. In certain embodiments, the combustor dome 123 can be made of a ceramic composite or any other suitable material, and other components can be made of any suitable material such as a suitable metal, ceramic, or composite, for example.

Figure 10:
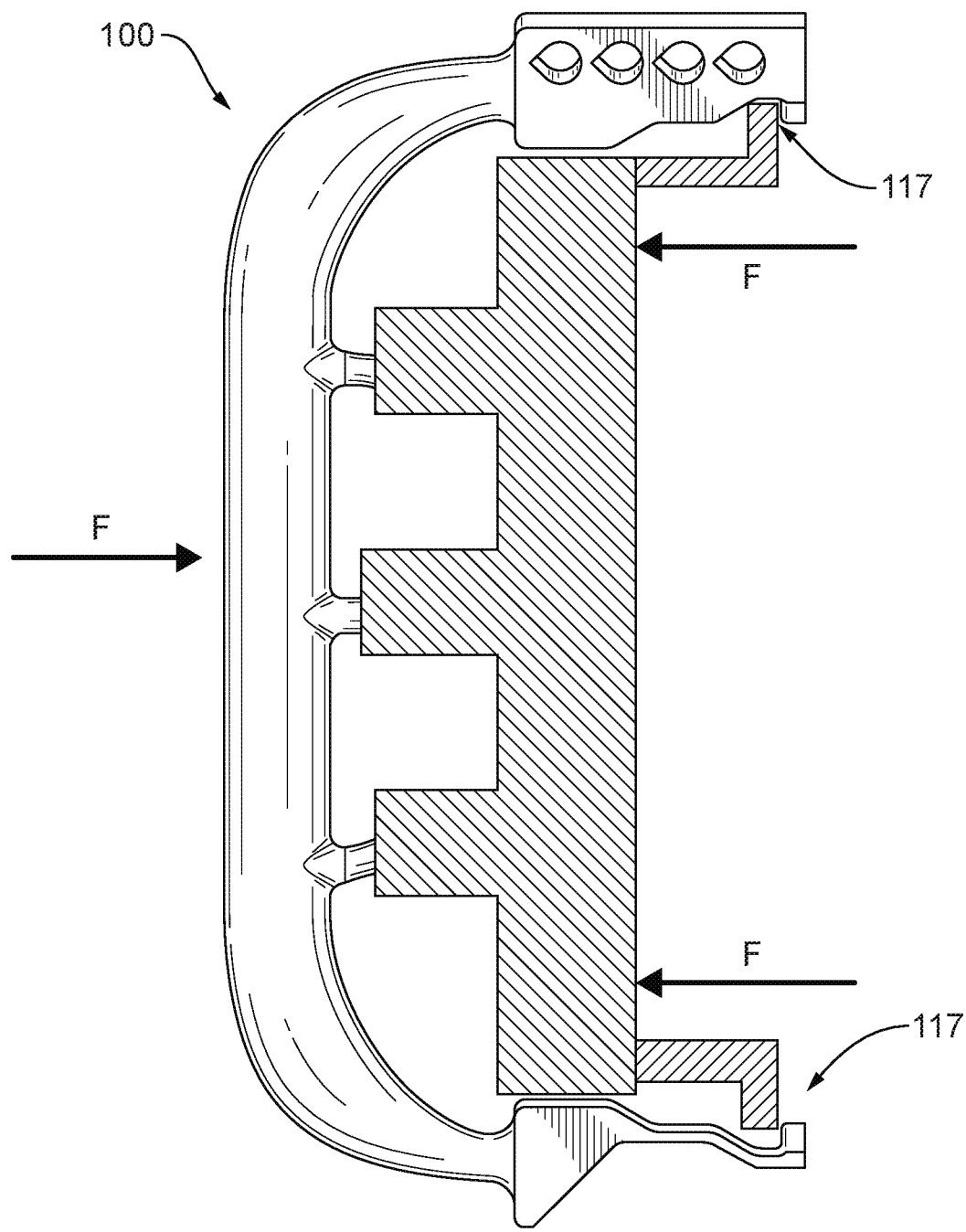
FIG. 10 is a side elevation schematic view of the cutaway section of the embodiment of FIG. 9, showing a force schematic of the installed components within the fuel manifold.

Referring additionally to FIG. 10, in certain embodiments, the combustor dome 123 can be mounted to the fuel manifold 100 with one or more (e.g., two as shown) retaining rings 119 which press against the combustor dome 123 to provide positive force to engage each fuel injector 125a, 125b, 125c with each fuel injector connector 113a, 113b, 113c. In certain embodiments, the two retainer rings 119 can include combustor seals 127. The retainer rings 119 can be an elastic element configured to provide compressive force (e.g., a c-seal) shaped to operate as a bayonet fitting (e.g., by inserting and turning) to lock in place and provide compression.

Figure 12:
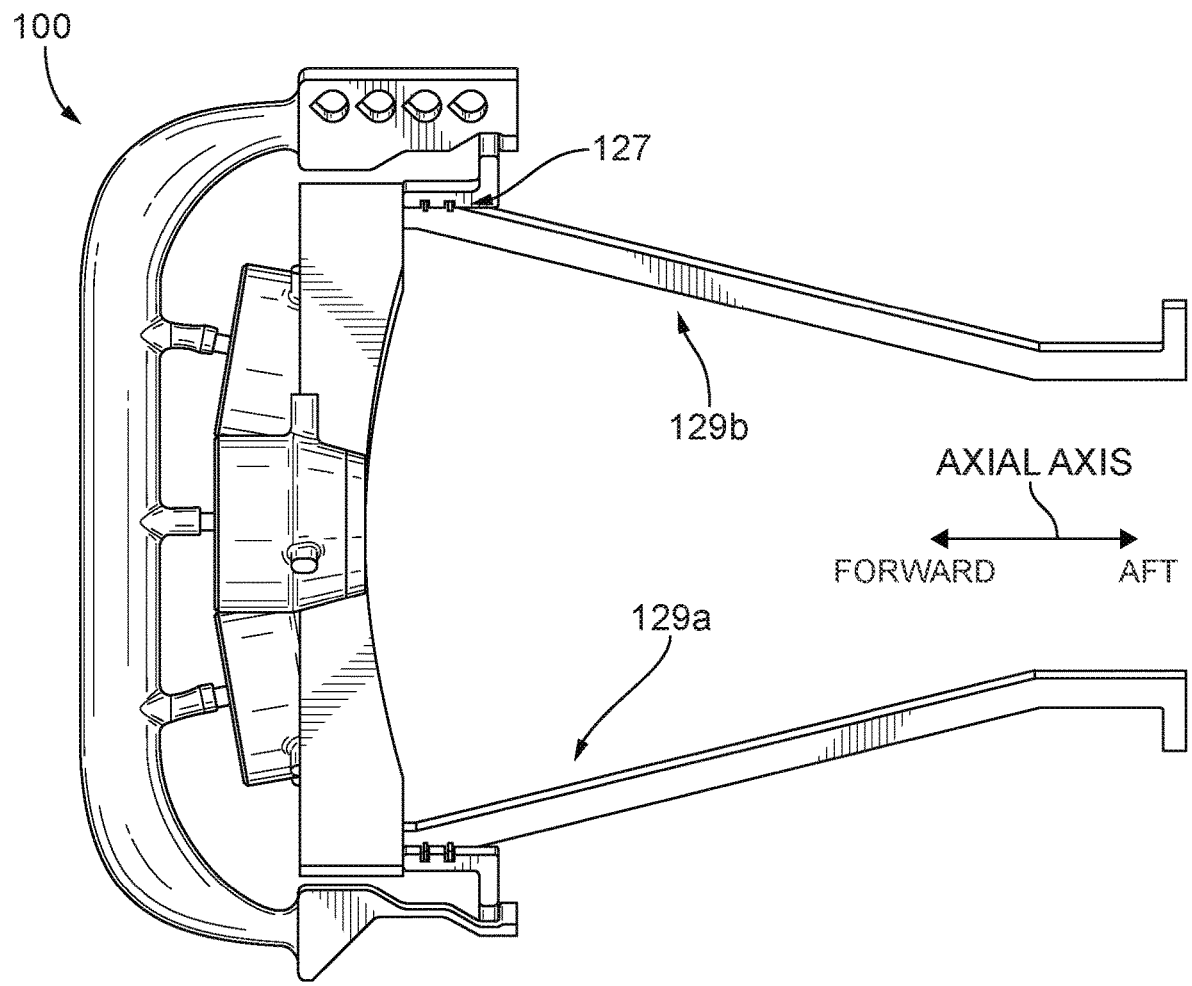
FIG. 12 is a side elevation view of a cutaway section of the embodiment of FIG. 9, showing a combustor liner disposed within the flex rings.

As shown in FIG. 12, the system 121 can include a combustor liner 129a, 129b (e.g., comprised of an inner combustor cone 129a and an outer combustor cone 129b) disposed between the retainer rings 119 in contact with the combustor seals 127. In certain embodiments, the combustor line 129a, 129b can be a short, largely featureless device compared to traditional combustors because the dome 123 can admit all combustion air needed.

The plurality of fuel injectors 125a, 125b, 125c can be disposed in the combustor dome 123 in a plurality of circumferential rows as shown to allow radial fuel staging. In certain embodiments, each fuel injector 125a, 125c in a radially outward row and radially inward row can be angled relative to an axial axis to effuse fuel and air into the combustor liner 129a, 129b parallel to or away from walls of the combustor liner to prevent impingement on the walls of the combustor liner 129a, 129b.

Figure 11:
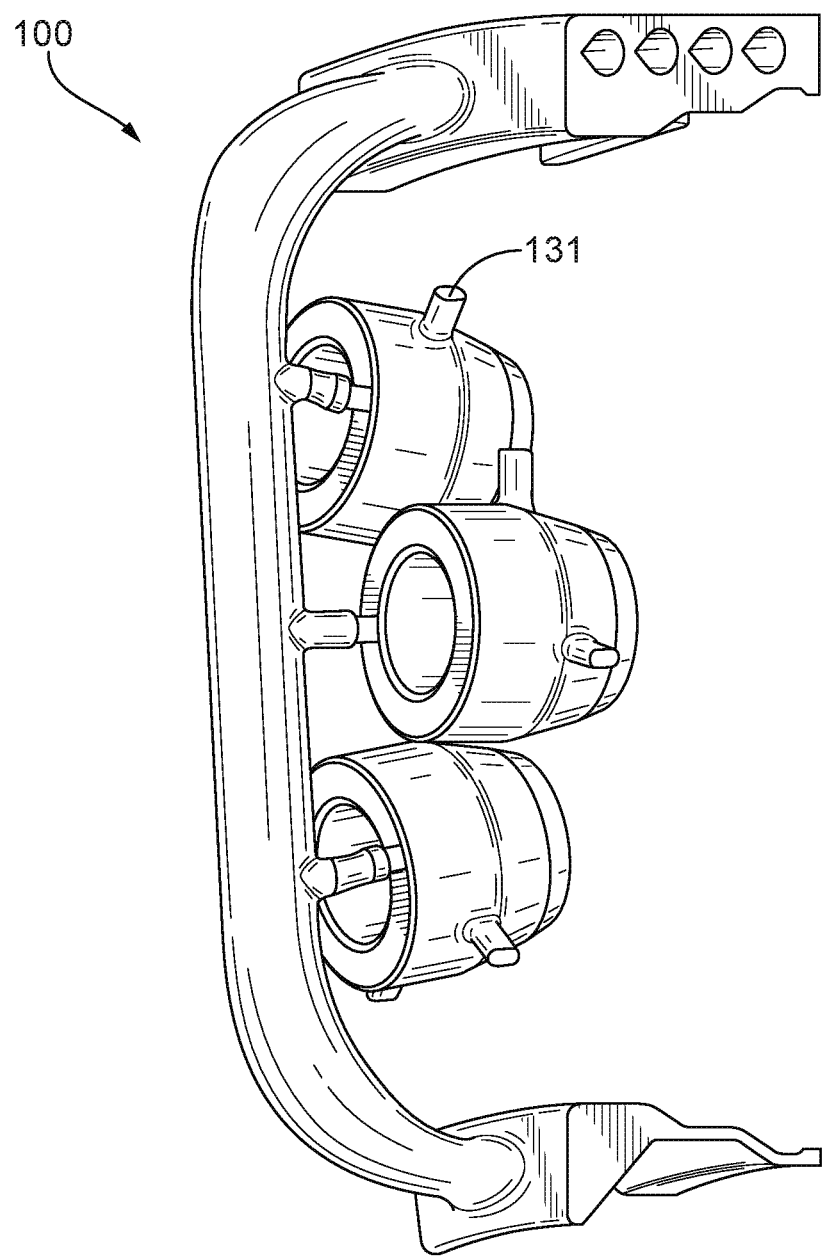
FIG. 11 is a perspective view of the cutaway section of the embodiment of FIG. 9, showing isolated fuel injectors connected to the branch.

As shown in FIGS. 11 and 12, each of the fuel injectors 125a, 125b, 125c can include one or more standoff features 131 configured to mate with one or more locator apertures 133 defined in the combustor dome 123 to orient each fuel injector 125a, 125b, 125c on the combustor dome 123 to such that each fuel injector 125a, 125b, 125c aligns with each fuel injector connector 113a, 113b, 113c. In certain embodiments, the plurality of fuel injectors includes 125a, 125b, 125c about 90 or more fuel injectors (e.g., about 180, about 250, or any large number of injection points).

Traditional systems typically only include 12 to 24 injection points at most. More injection points allow more control on how fuel and air are mixed, which allows much more efficient combustion and faster mixing (e.g., as a function of axial length) which allows combustor system to be shortened axially. This reduces size and weight of the turbomachine.

Any suitable components can be manufacture in any suitable manner. For example, one or more components (e.g., the manifold 100) may be additively manufactured. Embodiments include three or more (e.g., four) separately controlled fuel channels to control flow volume to the nozzles. Individual channels can connect the main manifold to fuel injectors. For example, in some embodiments, each channel feeds different "radial row" (a row defined by a circumferential line). As shown, the fourth channel 101d can be reserved to have pilot flow channels connected, e.g., for minimum fuel to maintain light. For example, in every other branch, the middle row can be connected to fourth channel 101d, or any other suitable pattern or arrangement (e.g., a single branch and/or any other suitable nozzle location). Any suitable configuration is contemplated herein.

Reduction of air flow blockage can be accomplished by thin struts containing the fuel channels. The branches can be stiffened and strengthened by the out and inner ring elements which can act as clasps to attach the combustor segments. The combustor openings can be located relative to these rings rather than the out case.

Figure 15:
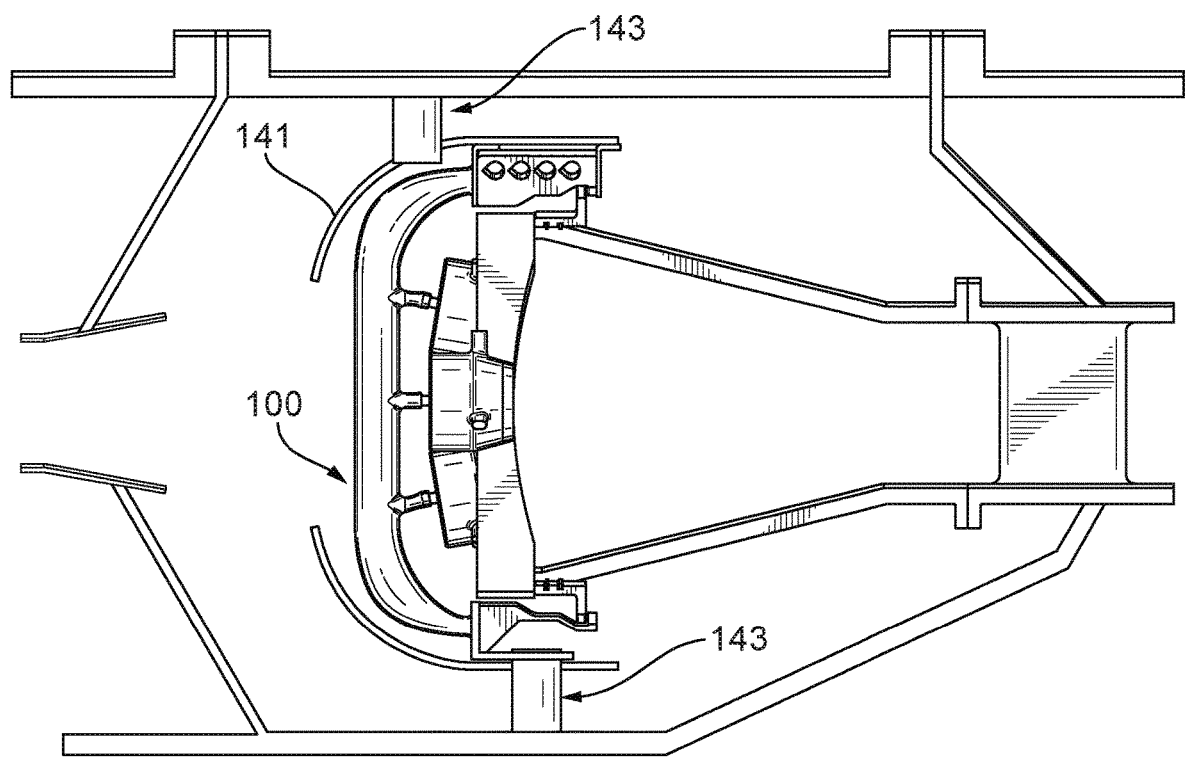
FIG. 15 is a side elevation view of a cutaway section of an embodiment of fuel injector assembly in accordance with this disclosure, shown within a turbomachine casing.

Referring to FIG. 15, a cowling 141 (e.g. a pressure recovery cowling) can provide a support structure 143 and heat shielding. As shown, the manifold 100 can attach to the cowling 141 and/or support structure 143 in any suitable manner.

Figure 16:
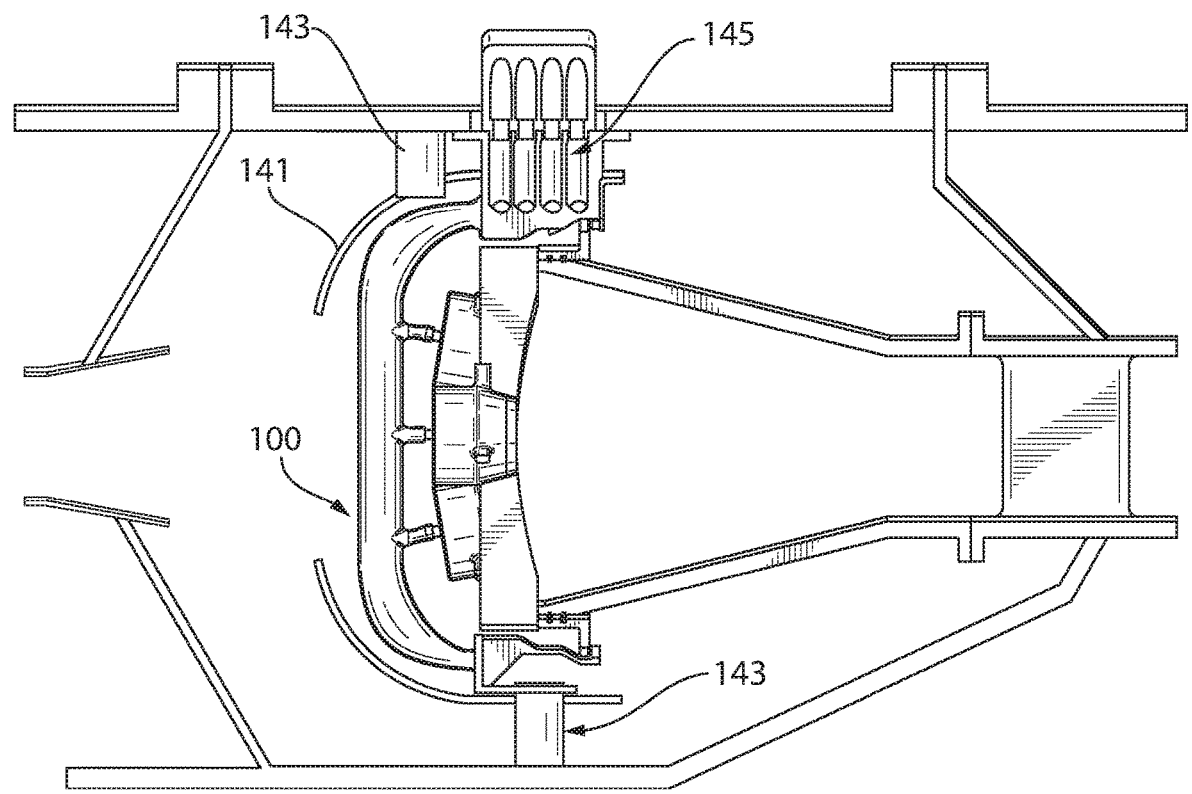
FIG. 16 is a side elevation view of a cutaway section of an embodiment of fuel injector assembly in accordance with this disclosure; shown within a turbomachine casing.

Referring to FIG. 16, fuel inlets 145 can connect to external fuel lines in one or more locations around the circumference of the outer ring 101 of the manifold. Each inlet channel can be separately controlled to provide independent fuel flow in each channel.

Figure 13:
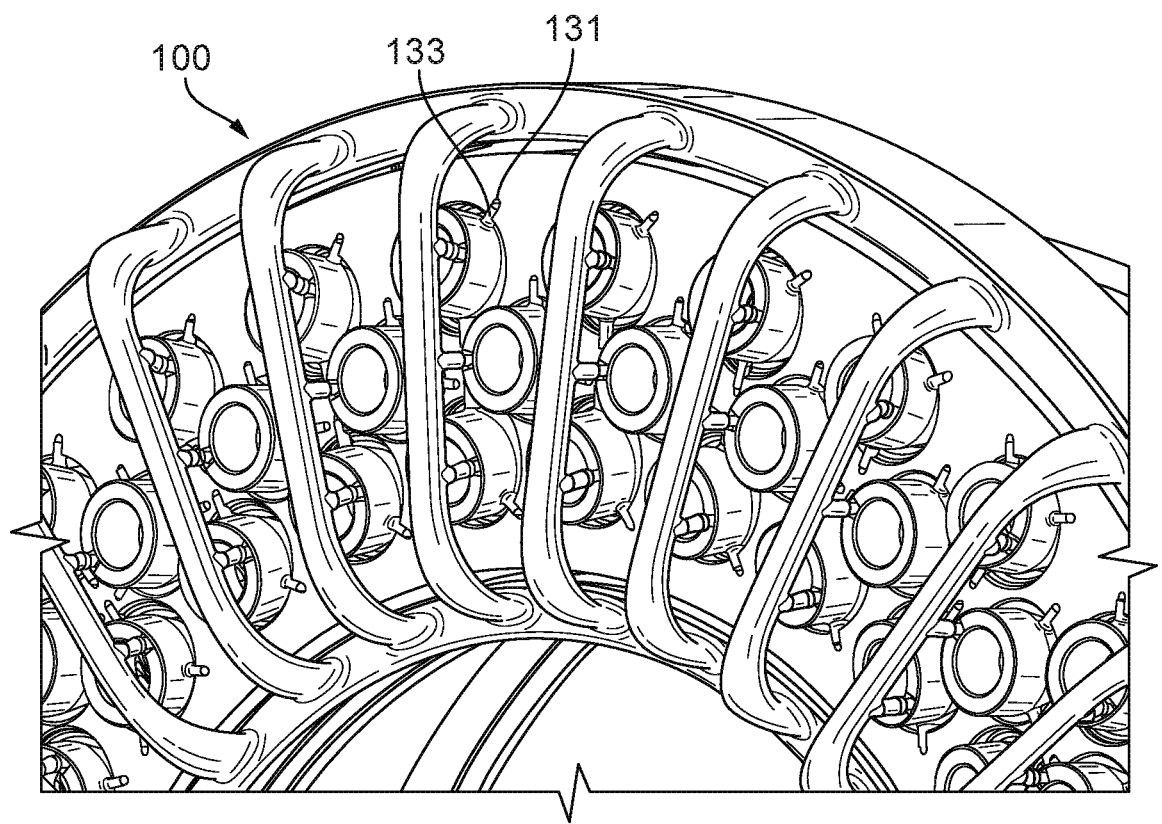
FIG. 13 is a partial perspective view of an embodiment of a fuel injector assembly in accordance with this disclosure.
Figure 14:
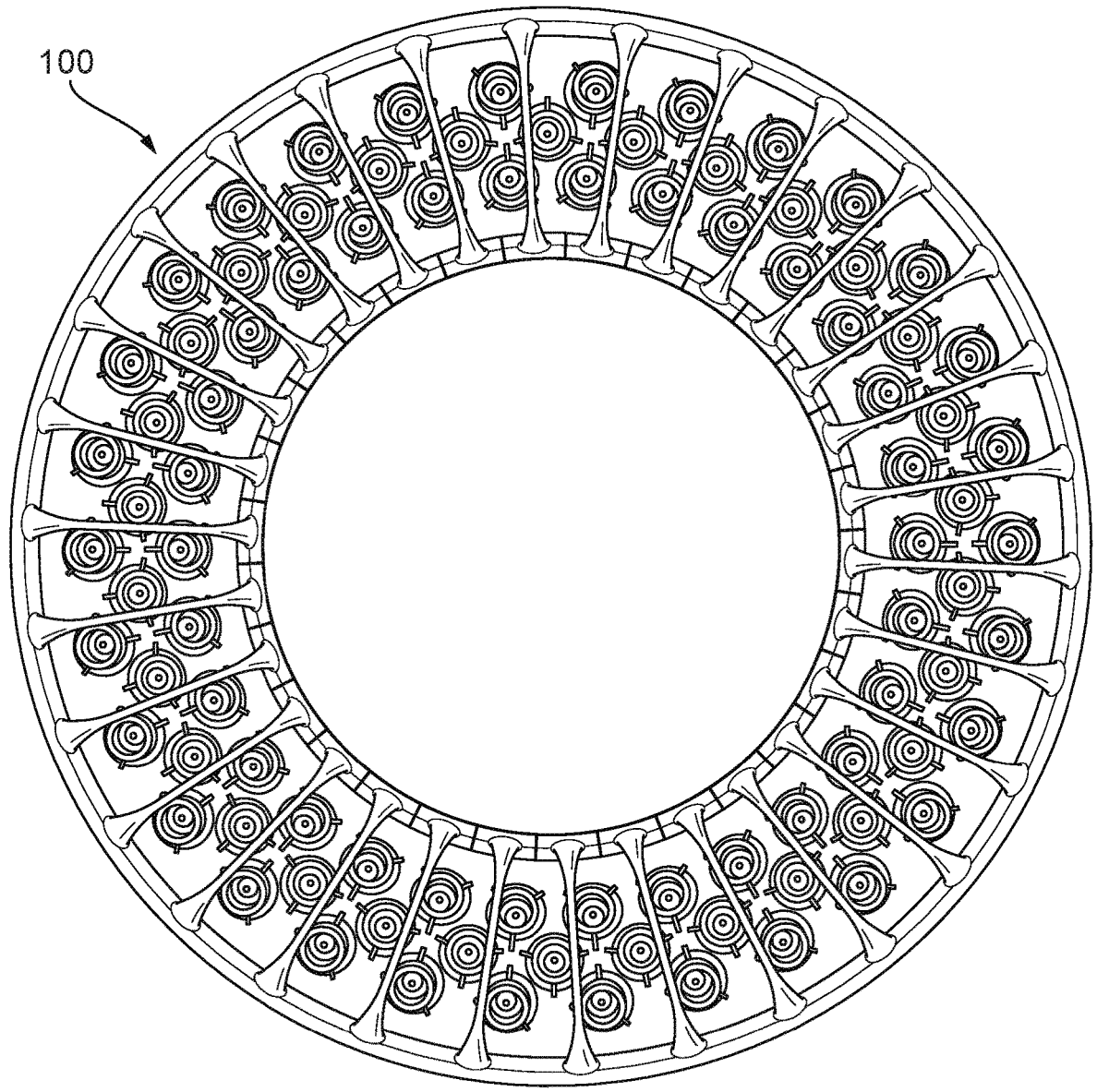
FIG. 14 is a plan view of the embodiment of FIG. 13.

In embodiments, a multi-point injection arrangement offers outstanding combustion performance without premixing. FIGS. 13 and 14 shows a high density of injectors, which on top of increased efficiency, also causes cooling of the combustor dome 123. Using embodiments, the turbine will see much more uniform heat distribution by having more injection points than traditional systems, for example.

Embodiments of a manifold locate individual injectors closely to combustor dome and allow reduction of fuel impingement on walls of the combustor. The branches 105 can also be shaped such that they remove swirl from compressor air due to their shape (e.g., like a flat stator) which can be beneficial for each nozzle to function.

Embodiments offer fully assembled structure that is still but offers minimal blockage to air flow. Embodiments of the fuel injection system are integrated into combustor design. Embodiments include a combustor that is dramatically reduced in length (e.g., reduced by half or more). For example, large dome flow reduces combustor hot wall length and reduces composite cost and weight, eliminates combustor holes and complexity, and improves durability. Embodiments can operate at high temperatures with low emissions combustion which can suit advanced, high pressure engines, for example.

Embodiments include an internal fuel manifold integrated with the combustor support, air cowls and combustor dome tiles, and large diameter nozzle air flow channels integrated into dome tiles to maximize the backside cooling by the combustion air prior to entering the combustor. Embodiments include increased injection sites which can permit very rapid mixing allowing for extremely short combustors. Embodiments allow holes in the high pressure casing to be minimized due to reduced engine weight. Embodiments allow radial fuel staging that can permit radial temperature profile control for the turbine. Embodiments allow extremely low temperature pattern factor that can be achieved for the turbine. Embodiments allow extremely low emissions to be achieved. Embodiments include very high durability, low cost mixers and better mechanical integration with the combustor.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An internal fuel manifold for a turbomachine, comprising:
   an outer ring defining one or more fuel supply channels configured to allow fuel flow around at least a portion of a circumference of the outer ring;
   a plurality of branches extending radially inward from the outer ring, wherein the branches include a high aspect ratio shape, wherein the plurality of branches include one or more branch fuel channels in fluid communication with at least one of the one or more fuel supply channels;
   one or more injector connectors extending axially aft from each branch, each injector connector in fluid communication with a branch fuel channel and configured to connect to a fuel injector; and
   an inner ring extending from the plurality of branches, wherein the inner ring and the outer ring are configured to receive a fuel injector and combustor assembly therebetween and to allow retaining of the fuel injector and combustor assembly to the internal fuel manifold.

2. The manifold of claim 1, wherein one or more branch fuel channels includes a plurality of branch fuel channels.

3. The manifold of claim 2, wherein the at least one or more injector connectors include a plurality of injector connectors.

4. The manifold of claim 3, wherein each branch fuel channel is connected to a respective injector connector.

5. The manifold of claim 4, wherein the one or more fuel supply channels include a plurality of fuel supply channels.

6. The manifold of claim 5, wherein the plurality of fuel supply channels include at least as many fuel supply channels as there are branch fuel channels in each branch such that each injector connector can be supplied with fuel independent of other injector connectors on the same branch.

7. The manifold of claim 3, wherein the plurality of injector connectors are disposed radially along the branch to form circumferential rows with injector connectors of other branches.

8. The manifold of claim 3, wherein each of the plurality of injector connectors extend from the branch in a different direction.

9. The manifold of claim 1, wherein the inner ring is segmented to accommodate thermal expansion such that the inner ring is comprised of detached segments that can move relative to each other.

10. The manifold of claim 1, wherein the branch includes a pull handle shape such that the branch extends axially forward from the outer ring and the inner ring.

11. The manifold of claim 1, wherein the outer ring and the inner ring define a bayonet flange for connecting the fuel injector assembly using one or more retainer rings.

12. A fuel injector system, comprising:
    a fuel manifold as recited in claim 1;
    a combustor dome mounted to the fuel manifold with one or more retainer rings; and
    a plurality of fuel injectors disposed in the combustor dome, each fuel injector connected to a fuel injector connector of the fuel manifold and configured to mix air and fuel.

13. The system of claim 12, wherein the combustor dome is mounted to the fuel manifold with two retaining rings which presses against the combustor dome to provide positive force to engage each fuel injector with each fuel injector connector.

14. The system of claim 13, wherein the two retainer rings include combustor seals.

15. The system of claim 14, further comprising a combustor liner disposed between the retainer rings in contact with the combustor seals.

16. The system of claim 12, wherein the plurality of fuel injectors are disposed in a plurality of circumferential rows to allow radial fuel staging.

17. The system of claim 16, wherein each fuel injector in a radially outward row and radially inward row are angled relative to an axial axis to effuse fuel and air into the combustor liner parallel to or away from walls of the combustor liner to prevent impingement on the walls of the combustor liner.

18. The system of claim 17, wherein each of the fuel injectors include one or more standoff features configured to mate with one or more locator apertures defined in the combustor dome to orient each fuel injector on the combustor dome to such that each fuel injector aligns with each fuel injector connector.

19. The system of claim 12, wherein the plurality of fuel injectors includes about 90 or more fuel injectors.

20. A method of making an internal fuel manifold for a turbomachine, comprising:
    additively manufacturing:
        an outer ring defining one or more fuel supply channels configured to allow fuel flow around at least a portion of a circumference of the outer ring;
        a plurality of branches extending radially inward from the outer ring, wherein the branches include a high aspect ratio shape, wherein the plurality of branches include one or more branch fuel channels in fluid communication with at least one of the one or more fuel supply channels;
        one or more injector connectors extending axially aft from each branch, each injector connector in fluid communication with a branch fuel channel and configured to connect to a fuel injector; and
        an inner ring extending from the plurality of branches, wherein the inner ring and the outer ring are configured to receive a fuel injector and combustor assembly therebetween and to allow retaining of the fuel injector and combustor assembly to the internal fuel manifold.

* * * * *